(12) United States Patent
Guha (10) Patent No.: US 7,664,744 B2
(45) Date of Patent: Feb. 16, 2010

(54) QUERY CATEGORIZER

(75) Inventor: Sudipta Guha, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 356 days.

(21) Appl. No.: 11/881,503

(22) Filed: Jul. 26, 2007

(65) Prior Publication Data

US 2008/0016046 A1 Jan. 17, 2008

Related U.S. Application Data (63) Continuation-in-part of application No. 11/486,818, filed on Jul. 14, 2006.

(51) Int. Cl.
G06F 7/00 (2006.01)

(52) U.S. Cl. ............................. 707/3; 707/7
(58) Field of Classification Search ............... 707/1–10
See application file for complete search history.

(56) References Cited

U.S. PATENT DOCUMENTS

| | | | |
|---|---|---|---|
| 4,255,796 A | 3/1981 | Gabbe et al. | |
| 4,433,392 A | 2/1984 | Beaven | |
| 5,278,980 A | 1/1994 | Pedersen et al. | |
| 5,845,278 A | 12/1998 | Kirsch et al. | |
| 6,169,986 B1 | 1/2001 | Bowman et al. | |
| 6,411,950 B1 | 6/2002 | Moricz et al. | |
| 6,772,150 B1 | 8/2004 | Whitman et al. | |
| 7,039,635 B1 | 5/2006 | Morgan et al. | |
| 7,181,438 B1 | 2/2007 | Szabo | |
| 7,249,126 B1 | 7/2007 | Ginsburg et al. | |
| 7,487,144 B2 * | 2/2009 | Shakib et al. | 707/3 |
| 7,499,940 B1 | 3/2009 | Gibbs | |
| 2002/0152204 A1 | 10/2002 | Ortega et al. | |
| 2003/0101172 A1 | 5/2003 | De La Huerga | |

(Continued)

FOREIGN PATENT DOCUMENTS

WO WO 2004/073286 8/2004

(Continued)

OTHER PUBLICATIONS

"Communication pursuant to Article 94(3) EPC" received in Application No. 06 801 807.6-2201 dated Mar. 26, 2009 (7 pages).

(Continued)

*Primary Examiner*—Wilson Lee
(74) *Attorney, Agent, or Firm*—Hickman Palermo Truong & Becker LLP; Christian A. Nicholes (57) ABSTRACT

In response to a user's submission of a set of query terms through an Internet search engine's user interface, the Internet search engine automatically ranks multiple verticals based on the estimated probabilities that those verticals will contain relevant content. After the verticals have been ranked, a set of the highest-ranked verticals is selected. Search results from each of the verticals in the selected set are presented to the user. Thus, the user may obtain a sample from verticals that are the most likely to contain relevant content. The search engine may rank a set of verticals based on historical search result selection data for similar sets of query terms. The historical search result selection data for a set of query terms indicates, for each vertical, the number of times that any user selected a search result from that vertical after conducting a search based on that set of query terms.

14 Claims, 6 Drawing Sheets

U.S. PATENT DOCUMENTS

| | | |
|---|---|---|
| 2003/0195877 A1* | 10/2003 | Ford et al. ................ 707/3 |
| 2003/0234821 A1 | 12/2003 | Pugliese |
| 2004/0021691 A1 | 2/2004 | Dostie et al. |
| 2004/0143564 A1 | 7/2004 | Gross et al. |
| 2004/0153963 A1 | 8/2004 | Simpson et al. |
| 2004/0267730 A1 | 12/2004 | Dumais et al. |
| 2005/0283468 A1 | 12/2005 | Kamvar et al. |
| 2005/0288959 A1 | 12/2005 | Eraker et al. |
| 2006/0064411 A1 | 3/2006 | Gross et al. |
| 2006/0173822 A1 | 8/2006 | Watson et al. |
| 2006/0190436 A1 | 8/2006 | Richardson et al. |
| 2007/0226198 A1 | 9/2007 | Kapur |
| 2007/0244863 A1* | 10/2007 | Adams et al. ................ 707/3 |
| 2008/0077558 A1 | 3/2008 | Lawrence et al. |

OTHER PUBLICATIONS

Current Claims of 06 801 807.6-2201 dated May 9, 2008 (3 pages).

Schurman, Kyle, "Microsoft Money 2005 Premium, Introducing Microsoft Money 2005", Smart Computing website, Feb. 2005, vol. 16, Issue 2, 3 pages.

"Communication Pursuant to Article 94(3) EPC" received in European case 06801807.6 dated Jun. 6, 2008, 3 pages.

Ling, M. et al., "An Intelligent Search Engine for WWW" Aug. 14, 2000 (5 pages), Translation only.

* cited by examiner

QUERY CATEGORIZER

CLAIM OF PRIORITY AND CROSS-REFERENCE TO RELATED APPLICATIONS

The present patent application claims the benefit of priority under 35 U.S.C. §120 as a continuation-in-part of U.S. patent application Ser. No. 11/486,818, titled "SEARCH EQUALIZER" (filed on Jul. 14, 2006), which is incorporated by reference herein.

The present patent application is also related to U.S. patent application Ser. No. 11/313,525, titled "INTERACTIVE SEARCH ENGINE" (filed on Dec. 20, 2005), which is incorporated by reference herein.

FIELD OF THE INVENTION

The present invention relates to search engines, and, more specifically, to the selection of verticals from which to present search results.

BACKGROUND

An abundance of information is available via the Internet. Users can direct web browser applications, such as Mozilla Firefox, to various Uniform Resource Locators (URLs) in order to view content that is associated with those URLs. In order to assist users in locating certain kinds of content for which the users do not know the associated URLs, various Internet search engines have emerged. Yahoo! is the owner and operator of one of these Internet search engines.

A user can enter a set of query terms into an Internet search engine's user interface. The Internet search engine receives the query terms and searches an index for known content items that are associated with the query terms. The Internet search engine creates a list of content items that are relevant to the submitted query terms. The Internet search engine returns the list to the user.

The earliest Internet search engines returned search results from the Internet as a whole, without any regard to any specific categories into which those search results could fit. As Internet search engines evolved, certain content categories, called "verticals," became recognized. Given the set of all content that is accessible via the Internet, a "vertical" is a subset of that content that satisfies some criteria that are associated with that vertical.

For example, one vertical recognized by the Yahoo! Internet search engine is the "images" vertical. The "images" vertical only consists of Internet-accessible images (e.g., files representing visual content in a format such as GIF, JPEG, bitmap, etc.). The "images" vertical excludes all content that is not image content. Regular Hypertext Markup Language (HTML) web pages are excluded from the "images" vertical, although images embedded within such HTML web pages may be included within the "images" vertical.

The Yahoo! Internet search engine allows a user to specify, in addition to a set of query terms, a specific vertical in which the user would like to conduct a search for content. The verticals from which a user of the Yahoo! Internet search engine may select include "web" (which includes all query-term relevant search results unfiltered by any vertical criteria), "video," "images," "local," "shopping," "answers," "audio," "directory," "jobs," and "news." If a user conducts a search using a particular set of query terms in the "web" vertical, then the user might obtain a much larger but much less focused set of search results than if the user conducted the search using the same particular set of query terms in a more specific vertical such as "images." If the user knows at the outset that the user is specifically interested in images that are relevant to the query terms, then the user might be better off conducting the search in the "images" vertical instead of the "web" vertical.

Unfortunately, many users are unaware of and have never searched verticals other than the very broad and inclusive "web" vertical (which is typically the default vertical searched in the absence of the user's express selection of some other vertical). Other than by using a trial-and-error approach in which the user tries submitting the same query terms in each vertical, a user might not be able to ascertain which of the several verticals is most likely to yield search results in which the user is genuinely interested. Most users are unwilling to employ such an approach. As a result, many users miss finding content in which they would be highly interested, and which they might have found had they taken the time and effort to search a specific vertical.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

Various embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, in response to a user's submission of a set of query terms through an Internet search engine's user interface, the Internet search engine automatically ranks multiple verticals based on the estimated probabilities that those verticals will contain content that would be of interest to the user. After the verticals have been ranked, a set of the highest-ranked verticals is automatically selected. Search results from each of the verticals in the selected set are presented to the user. Thus, in one embodiment of the invention, the user is able to obtain a sample from several different verticals—and more specifically, the verticals that are the most likely to contain content in which the user is interested.

For example, given a particular set of query terms, the Internet search engine might determine that the "image" and "news" verticals are the most likely of the verticals to contain content that will interest the user. Consequently, the Internet searching engine might present a set of search results obtained by (a) performing a search in the "image" vertical and (b) performing a search in the "news" vertical. The Internet search engine may segregate the set of search results by vertical so that the user knows from which vertical each of the search results came.

According to one technique described herein, in response to receiving a set of query terms, the Internet search engine ranks a set of verticals based at least in part on historical search result selection data for similar sets of query terms. The historical search result selection data for a particular set of query terms indicates, for each vertical, the number times that any user selected (or "clicked on") a search result from that vertical after conducting a search based on that particular set of query terms. For example, in response to a user's submission, to the Internet search engine, of a set of query terms, the Internet search engine may determine, for each vertical, a number of times that users selected, from that vertical, search results that were returned in previous searches that were based on the same set of query terms. The Internet search engine may rank verticals from which many users previously selected search results more favorably than verticals from which few users previously selected search results.

According to one technique described herein, only a specified subset of all of the historical search result selection data (e.g., only historical search result selection data from the last year) is considered when ranking the verticals as discussed above.

Example Vertical Ranking Technique

In one embodiment of the invention, given a set of query terms, verticals are ranked based on both (a) a frequency with which users previously submitted that set of query terms when those users conducted searches relative to those verticals and (b) a frequency with which users previously selected (or "clicked on") search results within those verticals after those users conducted searches based on that set of query terms. Techniques for ranking verticals based on these factors are discussed below with reference to FIGS. 1A-D.

Ranking Verticals Based on Historical Query Frequency

FIGS. 1A-D are flow diagrams that illustrate a technique for ranking verticals based on a user-submitted set of query terms, according to an embodiment of the invention. Alternative embodiments of the invention may involve more, fewer, or different steps than those illustrated in FIGS. 1A-D.

Figure 1A:
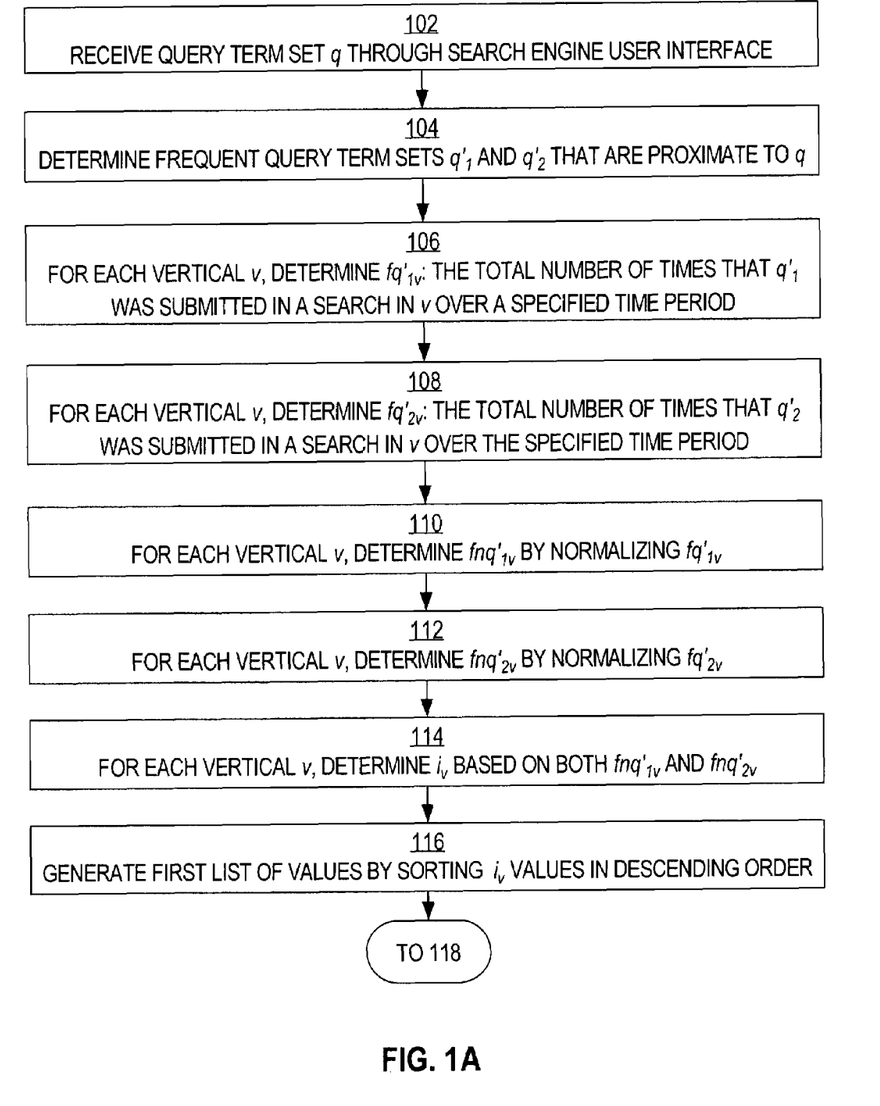
FIGS. 1A-D are flow diagrams that illustrate a technique for ranking verticals based on a user-submitted set of query terms, according to an embodiment of the invention.

Referring first to FIG. 1A, in block 102, an Internet search engine receives a set of query terms q from a user through the Internet search engine's user interface. For example, the set of query terms q might be "Britney Spears."

In block 104, the Internet search engine automatically determines two related query term sets $q'_1$ and $q'_2$ based on q. In one embodiment of the invention, a "gossip server" automatically determines $q'_1$ and $q'_2$ for the Internet search engine. To determine $q'_1$ and $q'_2$, the gossip server first selects, from among all query term sets that any users previously submitted to the Internet search engine, all of the query term sets whose "proximity" to q exceeds a specified threshold. In one embodiment of the invention, a query term set's "proximity" to q is based on the size of the intersection of two sets: (a) the set of search results returned by a search (in the "web" vertical) based on the query term set and (b) the set of search results returned by a search (in the "web" vertical) based on q. Thus, if a search based on a particular query term set returns a set of search results that is highly similar to the set of search results returned by a search based on q, then the particular query term set is considered to have a high proximity to q. After the gossip server has selected the all of the query term sets whose "proximity" to q exceeds the specified threshold, the gossip server selects, from among these high-proximity query term sets, the two query term sets that users submitted to the Internet search engine the greatest number of times over the specified time period. The gossip server selects these two query term sets to be $q'_1$ and $q'_2$. For example, if q is "Britney Spears," then $q'_1$ might also be "Britney Spears," and $q'_2$ might be "Baby One More Time" or "Kevin Federline" (depending on the specified time period).

In block 106, for each vertical v in the set of verticals, the Internet search engine determines, based on historical query data, a frequency $fq'_{1v}$ for that vertical. In one embodiment of the invention, $fq'_{1v}$ is the total number of times that users submitted the set of query terms $q'_1$ to the Internet search engine relative to vertical v over the specified period of time.

In block 108, for each vertical v in the set of verticals, the Internet search engine determines, based on historical query data, a frequency $fq'_{2v}$ for that vertical. In one embodiment of the invention, $fq'_{2v}$ is the total number of times that users submitted the set of query terms $q'_2$ to the Internet search engine relative to vertical v over the specified period of time.

In block 110, for each vertical v in the set of verticals, the Internet search engine determines a normalized frequency $fnq'_{1v}$ for that vertical by normalizing $fq'_{1v}$. In one embodiment of the invention, the Internet search engine calculates $fnq'_{1v}$ using the following formula:

$$fnq'_{1v} = fq'_{1v} \left( \frac{tq_{web}}{tq_v} \right) \left( \frac{\ln(uq_v)}{\ln(uq_{web})} \right),$$

where $tq_{web}$ is the total number of queries that users submitted to the Internet search engine relative to the "web" vertical (the default vertical) over the specified period of time, $tq_v$ is the total number of queries that users submitted to the Internet search engine relative to vertical v over the specified period of time, $uq_v$ is the number of unique sets of query terms that users submitted to the Internet search engine relative to vertical v over the specified period of time (counting multiple submissions of the same set of query terms only once), and $uq_{web}$ is the number of unique sets of query terms that users submitted to the Internet search engine relative to the "web" vertical over the specified period of time (counting multiple submissions of the same set of query terms only once).

In block 112, for each vertical v in the set of verticals, the Internet search engine determines a normalized frequency $fnq'_{2v}$ for that vertical by normalizing $fq'_{2v}$. In one embodiment of the invention, the Internet search engine calculates $fnq'_{2v}$ using the following formula:

$$fnq'_{2v} = fq'_{2v} \left( \frac{tq_{web}}{tq_v} \right) \left( \frac{\ln(uq_v)}{\ln(uq_{web})} \right),$$

where $tq_{web}$ is the total number of queries that users submitted to the Internet search engine relative to the "web" vertical (the default vertical) over the specified period of time, $tq_v$ is the total number of queries that users submitted to the Internet search engine relative to vertical v over the specified period of time, $uq_v$ is the number of unique sets of query terms that users submitted to the Internet search engine relative to vertical v over the specified period of time (counting multiple submissions of the same set of query terms only once), and $uq_{web}$ is the number of unique sets of query terms that users submitted to the Internet search engine relative to the "web" vertical over the specified period of time (counting multiple submissions of the same set of query terms only once).

In block 114, for each vertical v in the set of verticals, the Internet search engine determines a value $i_v$ for that vertical. The value $i_v$ represents the probability that a user intended to conduct a search relative to vertical v during the specified period of time using either $q_1$ or $q_2$ as the set of query terms. In one embodiment of the invention, the Internet search engine calculates $i_v$ using the following formula:

$$i_v = fnq'_{1v}\left(\frac{fnq'_{1v}}{fnq'_{1v} + fnq'_{2v}}\right) + fnq'_{2v}\left(\frac{fnq'_{2v}}{fnq'_{1v} + fnq'_{2v}}\right).$$

In block 116, the Internet search engine generates a first sorted list of values by ranking and sorting the values $i_v$ determined in block 114. In one embodiment of the invention, the Internet search engine places the values $i_v$ in descending order in the first sorted list. Each value in the list corresponds to a different vertical. For example, the first sorted list of values might correspond to the following verticals, in order: "web," "images," "news," "local," "video," "shopping," "answers," "audio," "directory," and "jobs." Control passes to block 118 of FIG. 1B.

Ranking Verticals Based on Historical Search Result Selection

The number of times in which a set of query terms was previously submitted in searches conducted relative to a particular vertical can be indicative of whether that particular vertical is likely to contain search results that will be of interest to a user who conducts a search using that same set of query terms. However, all too often, a user who conducts a search relative to a particular vertical will not actually investigate any of those search results in that particular vertical by selecting (or "clicking on") any of those search results. Thus, the number of search results that users previously selected (e.g., from an Internet search engine-generated search results page) within a vertical after conducting searches based on a particular set of query terms may be even more indicative of whether that vertical is likely to contain search results that will be of interest to a user who conducts a search using the particular set of query terms.

Figure 1B:
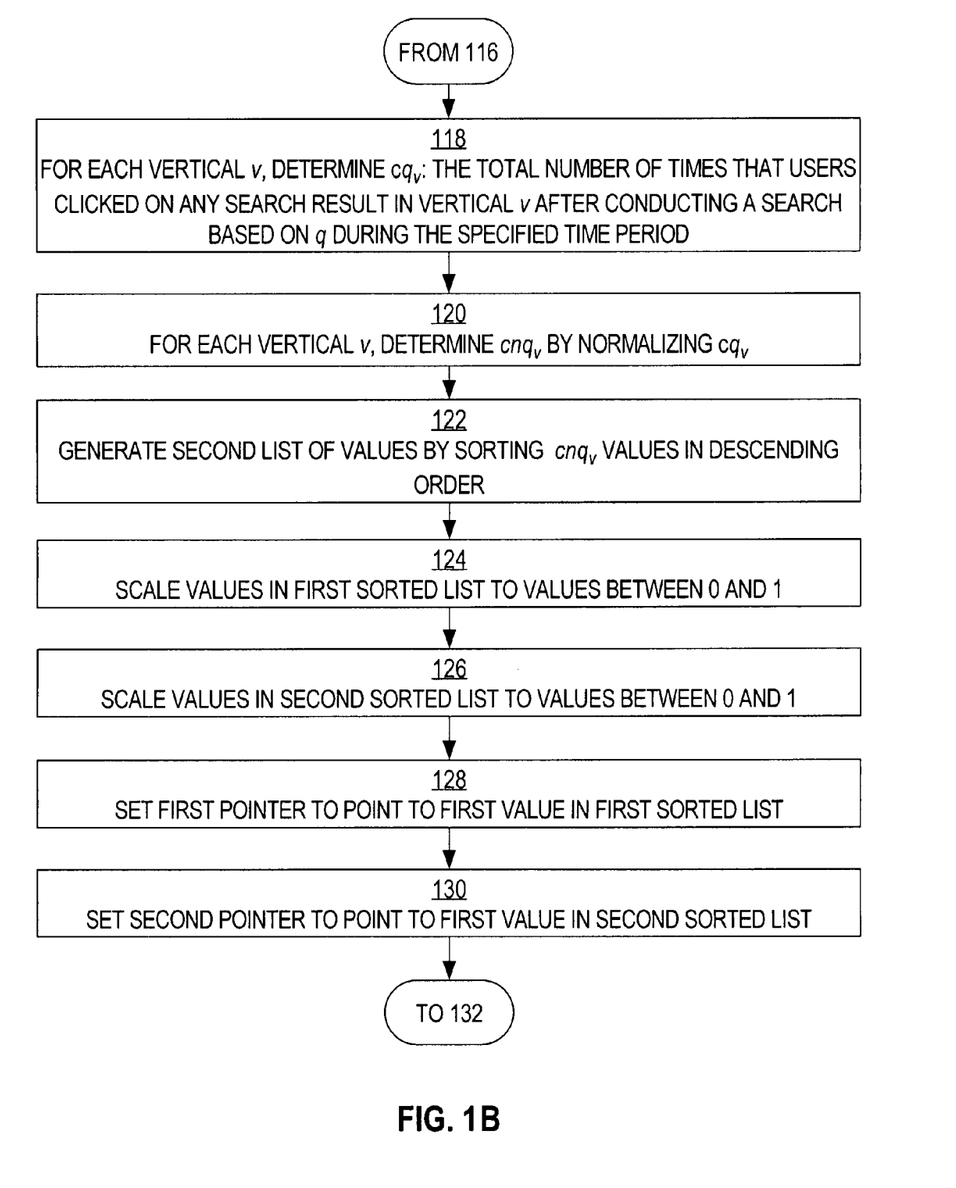

Therefore, referring to FIG. 1B, in block 118, for each vertical v in the set of verticals, the Internet search engine determines, based on historical search result selection data, a number of search result selections (or "clicks") $cq_v$ for that vertical. In one embodiment of the invention, $cq_v$ is the total number of times that users selected (or "clicked on") any search result in vertical v after conducting a search based on the set of query terms q during the specified period of time.

In block 120, for each vertical v in the set of verticals, the Internet search engine determines a normalized number of search result selections (or "clicks") $cnq_v$ for that vertical by normalizing $cq_v$. In one embodiment of the invention, the Internet search engine calculates $cnq_v$ using the following formula:

$$cnq_v = cq_v\left(\frac{tc_{web}}{tc_v}\right)\left(\frac{\ln(uc_v)}{\ln(uc_{web})}\right),$$

where $tc_{web}$ is the total number of search results that users selected (including multiple selections of the same search result) from the "web" vertical (the default vertical) after conducting a search using q as the set of query terms during the specified period of time, $tc_v$ is the total number of search results that users selected (including multiple selections of the same search result) from the vertical v after conducting a search using q as the set of query terms during the specified period of time, $uc_v$ is the number of unique sets of query terms that satisfy certain criteria specific to vertical v, and $uc_{web}$ is the number of unique sets of query terms that satisfy certain criteria specific to the "web" vertical. In one embodiment of the invention, a set of query terms satisfies the aforementioned criteria specific to vertical v only if the Internet search engine produced, in response to a user's submission of that set of query terms to the Internet search engine during the specified period of time, at least one search result that the user subsequently selected from vertical v. In one embodiment of the invention, a set of query terms satisfies the aforementioned criteria specific to the "web" vertical only if the Internet search engine produced, in response to a user's submission of that set of query terms to the Internet search engine during the specified period of time, at least one search result that the user subsequently selected from the "web" vertical. In one embodiment of the invention, no specific set of query terms is counted more than once in $uc_v$ (hence, "unique" sets of query terms). In one embodiment of the invention, no specific set of query terms is counted more than once in $uc_{web}$ (hence, "unique" sets of query terms).

If, sometime during the specified period, a user selected, from among the search results produced by the Internet search engine in response to the user's submission of a particular set of query terms, a search result from a particular vertical, then this is generally indicative that the particular vertical has some quality relative to the particular set of query terms. Thus, for each vertical v, $cnq_v$ calculated relative to a particular set of query terms is generally indicative of the quality of vertical v relative to the particular set of query terms.

In block 122, the Internet search engine generates a second sorted list of values by ranking and sorting the values $cnq_v$ determined in block 120. In one embodiment of the invention, the Internet search engine places the values $cnq_v$ in descending order in the second sorted list. Each value in the list corresponds to a different vertical. For example, the second sorted list of values might correspond to the following verticals, in order: "web," "shopping," "images," "video," "answers," "news," "directory," "jobs," "audio," and "local."

Composite Vertical Ranking

As is discussed above, in one embodiment of the invention, the Internet search engine generates a first sorted list of values based on historical query frequency in block 116, and the Internet search engine generates a second sorted list of values based on historical search result selection in block 122. In both lists, each value corresponds to a vertical. In one embodiment of the invention, the Internet search engine then generates a ranked list of verticals based on both the first sorted list of values and the second sorted list of values. Prior to the performance of the operations discussed below, the ranked list of verticals is empty; the operations discussed below selectively add verticals to the ranked list of verticals.

In block 124, the Internet search engine mathematically scales the values in the first sorted list of values so that those values lie between 0 and 1. In block 126, the Internet search engine mathematically scales the values in the second sorted list of values so that those values lie between 0 and 1. As a result of the operations of blocks 124 and 126, the values in the first and second lists can be compared to each other on a fair basis, without giving values from either list excessive weight or influence.

In block 128, the Internet search engine sets a first pointer to point to the first (i.e., greatest) value in the first sorted list. In block 130, the Internet search engine sets a second pointer to point to the first (i.e., greatest) value in the second sorted list. Control passes to block 132 of FIG. 1C.

Figure 1C:
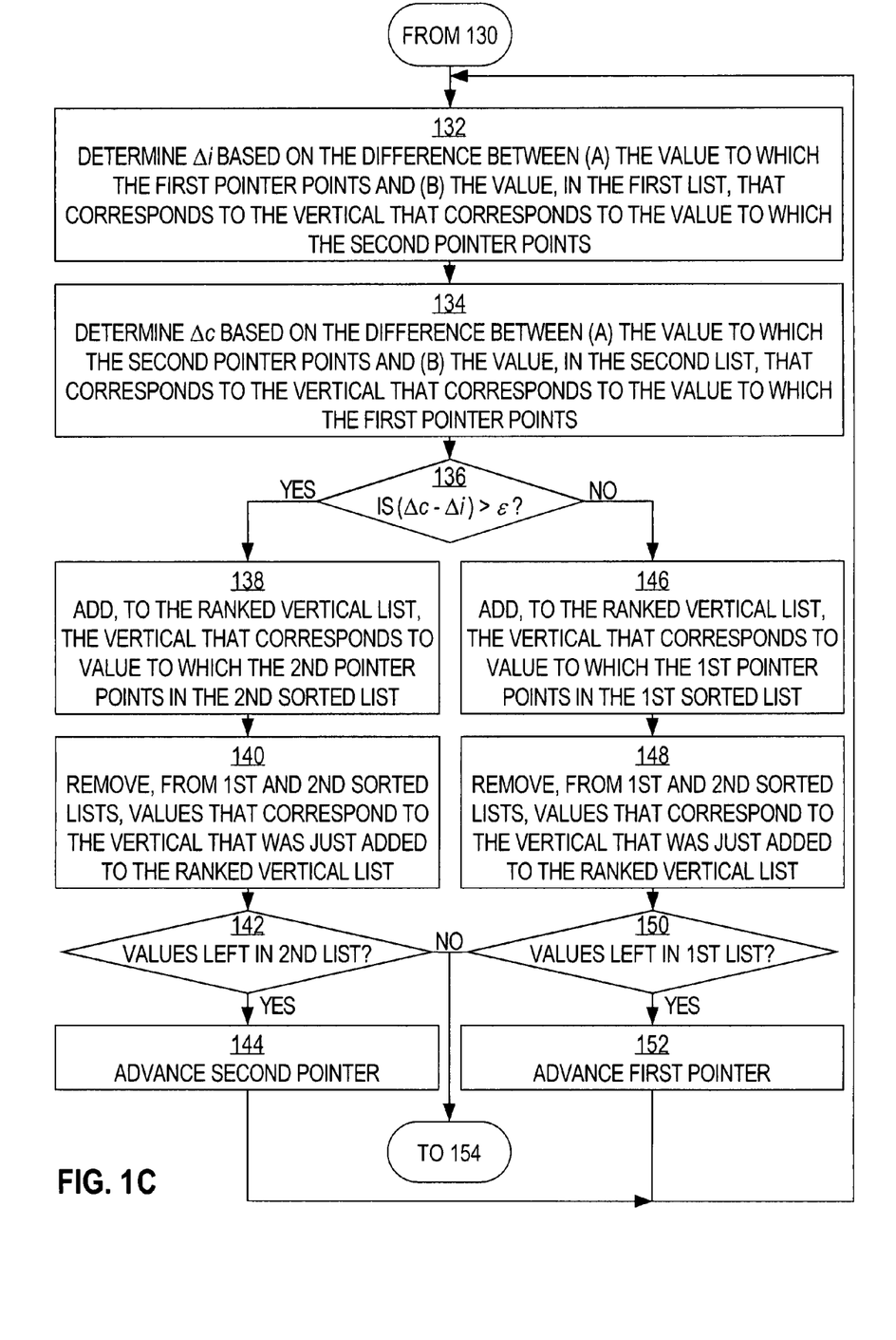

Referring next to FIG. 1C, in block 132, the Internet search engine determines a value $\Delta i$ using the following formula:

$$\Delta i = |i_x - i_y|,$$

where x is the vertical that corresponds to the value to which the first pointer currently points in the first sorted list, and y is the vertical that corresponds to the value to which the second pointer currently points in the second sorted list; thus, although $i_x$ and $i_y$ are both values in the first sorted list, $i_x$ is the value to which the first pointer currently points, and $i_y$ is the value that corresponds to the vertical that corresponds to the value $cnq_y$ (in the second sorted list) to which the second pointer points. For example, if (a) the first pointer currently points to $i_{news}$ (corresponding to vertical "news") and (b) the second pointer currently points to $cnq_{image}$ (corresponding to vertical "image"), then x would be "news," y would be "image," and the Internet search engine would calculate value $\Delta i$ as:

$$\Delta i = |i_{news} - i_{image}|.$$

In block 134, the Internet search engine determines a value $\Delta c$ using the following formula:

$$\Delta c = |cnq_x - cnq_y|,$$

where x is the vertical that corresponds to the value to which the first pointer currently points in the first sorted list, and y is the vertical that corresponds to the value to which the second pointer currently points in the second sorted list; thus, although $cnq_x$ and $cnq_y$ are both values in the second sorted list, $cnq_y$ is the value to which the second pointer currently points, and $cnq_x$ is the value that corresponds to the vertical that corresponds to the value $i_x$ (in the first sorted list) to which the first pointer points. For example, if (a) the first pointer currently points to $i_{news}$ (corresponding to vertical "news") and (b) the second pointer currently points to $cnq_{image}$ (corresponding to vertical "image"), then x would be "news," y would be "image," and the Internet search engine would calculate value $\Delta c$ as:

$$\Delta c = |cnq_{news} - cnq_{image}|.$$

In block 136, the Internet search engine determines whether the following inequality is true:

$$(\Delta c - \Delta i) > \epsilon,$$

where $\epsilon$ is a specified value that is chosen based on observation. In one embodiment of the invention, $\epsilon$ is 0.0018, but in alternative embodiments of the invention, $\epsilon$ may assume different values. If the inequality is true, then control passes to block 138. Otherwise, control passes to block 146.

In block 138, the Internet search engine adds, to the ranked list of verticals, the vertical that corresponds to the value to which the second pointer currently points in the second sorted list. For example, if the second pointer currently points to $cnq_{image}$ (corresponding to vertical "image"), then the Internet search engine adds the "image" vertical to the ranked list of verticals. Control passes to block 140.

In block 140, the Internet search engine removes, from the first sorted list and the second sorted list, the values that correspond to the vertical that was added to the ranked list of verticals in block 138. For example, if the "image" vertical was added to the ranked list of verticals in block 138, then the Internet search engine removes $cnq_{image}$ (corresponding to vertical "image") from the second sorted list, and the Internet search engine removes $i_{image}$ (also corresponding to vertical "image") from the first sorted list. Control passes to block 142.

In block 142, the Internet search engine determines whether any values remain in the second sorted list. If any values remain in the second sorted list, then control passes to block 144. Otherwise, control passes to block 154 of FIG. 1D.

In block 144, the Internet search engine sets the second pointer to point to the next value in the second sorted list. The first pointer continues to point to the same value in the first sorted list unless that value was removed from the first sorted list in block 140, in which case the Internet search engine additionally sets the first pointer to point to the next value in the first sorted list. Control passes back to block 132.

Alternatively, in block 146, the Internet search engine adds, to the ranked list of verticals, the vertical that corresponds to the value to which the first pointer currently points in the first sorted list. For example, if the first pointer currently points to $i_{news}$ (corresponding to vertical "news"), then the Internet search engine adds the "news" vertical to the ranked list of verticals. Control passes to block 148.

In block 148, the Internet search engine removes, from the first sorted list and the second sorted list, the values that correspond to the vertical that was added to the ranked list of verticals in block 146. For example, if the "news" vertical was added to the ranked list of verticals in block 146, then the Internet search engine removes $i_{news}$ (corresponding to vertical "news") from the first sorted list, and the Internet search engine removes $cnq_{news}$ (also corresponding to vertical "news") from the second sorted list. Control passes to block 150.

In block 150, the Internet search engine determines whether any values remain in the first sorted list. If any values remain in the first sorted list, then control passes to block 152. Otherwise, control passes to block 154 of FIG. 1D.

In block 152, the Internet search engine sets the first pointer to point to the next value in the first sorted list. The second pointer continues to point to the same value in the second sorted list unless that value was removed from the second sorted list in block 148, in which case the Internet search engine additionally sets the second pointer to point to the next value in the second sorted list. Control passes back to block 132.

Presenting Search Results from Selected Verticals

Figure 1D:
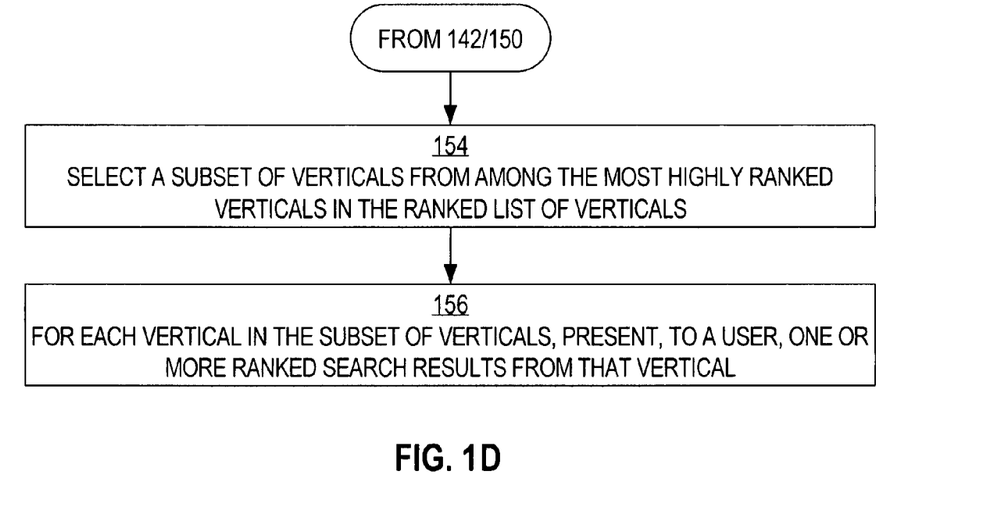

Referring to FIG. 1D, in block 154, the Internet search engine selects a subset of verticals from among the most highly ranked verticals in the ranked list of verticals that was constructed in blocks 132-152. In one embodiment of the invention, the subset comprises the three highest-ranked verticals in the ranked list of verticals. For example, the subset might comprise verticals "web," "image," and "news." Although in one embodiment of the invention the subset comprises multiple verticals, in an alternative embodiment of the invention, the subset comprises just one vertical. In one such alternative embodiment of the invention, the subset comprises the most highly ranked vertical other than the "web" vertical.

In block 156, for each vertical in the subset of verticals that the Internet search engine selected in block 154, the Internet search engine presents, to a user (e.g., the user from whom the Internet search engine received the set of query terms q in block 102) one or more ranked search results from that vertical. For example, the Internet search engine may display two or three search results from each vertical in the subset of verticals. The Internet search engine may display the search results from each vertical in a vertical-segregated manner, so that the user can discern from which vertical each of the displayed search results came. For example, the Internet search engine might display a header that says "news," under which two or more search results from the "news" vertical are displayed, and the Internet search engine might also display a header that says "images," under which two or more search results from the "images" vertical are displayed. In one embodiment of the invention, the Internet search engine presents each vertical's search results in the same order in which those verticals were ranked in the ranked list of verticals.

In one embodiment of the invention, if the search results from a particular vertical can be expressed in a non-verbal manner, then those search results are expressed in that non-verbal manner. For example, search results from the "images" vertical might be displayed as a smaller thumbnail version of the images to which those search results refer, and search results from the "video" vertical might be displayed as a smaller thumbnail version of a frame of the motion videos to which those search results refer.

Embodiments of the invention described above may be used in conjunction with an Internet search engine "portal" web page through which users can provide sets of query terms to the Internet search engine. In such embodiments, the Internet search engine may display search results to users by returning, to those users' Internet browsers, web pages that contain search results as described above. However, embodiments of the invention described above also may be used in conjunction with applications other than Internet browsers. For example, embodiments of the invention may be used in conjunction with applications such as e-mail client applications, news reading applications, word processing applications, etc. Such applications may receive search results from the Internet search engine and display those search results in a "pop-up" window that the application generates. In one embodiment of the invention, the set of query terms that the Internet search engine receives is not expressly submitted or created by the user, but is instead a set of query terms that is automatically selected by the application (e.g., from an e-mail message that the user is reading, or from a word that the user selected in some message or document). Embodiments of the invention may be used in conjunction with a mobile phone or other mobile device, which can display search results from multiple different verticals in a relatively small display space.

Figure 2:
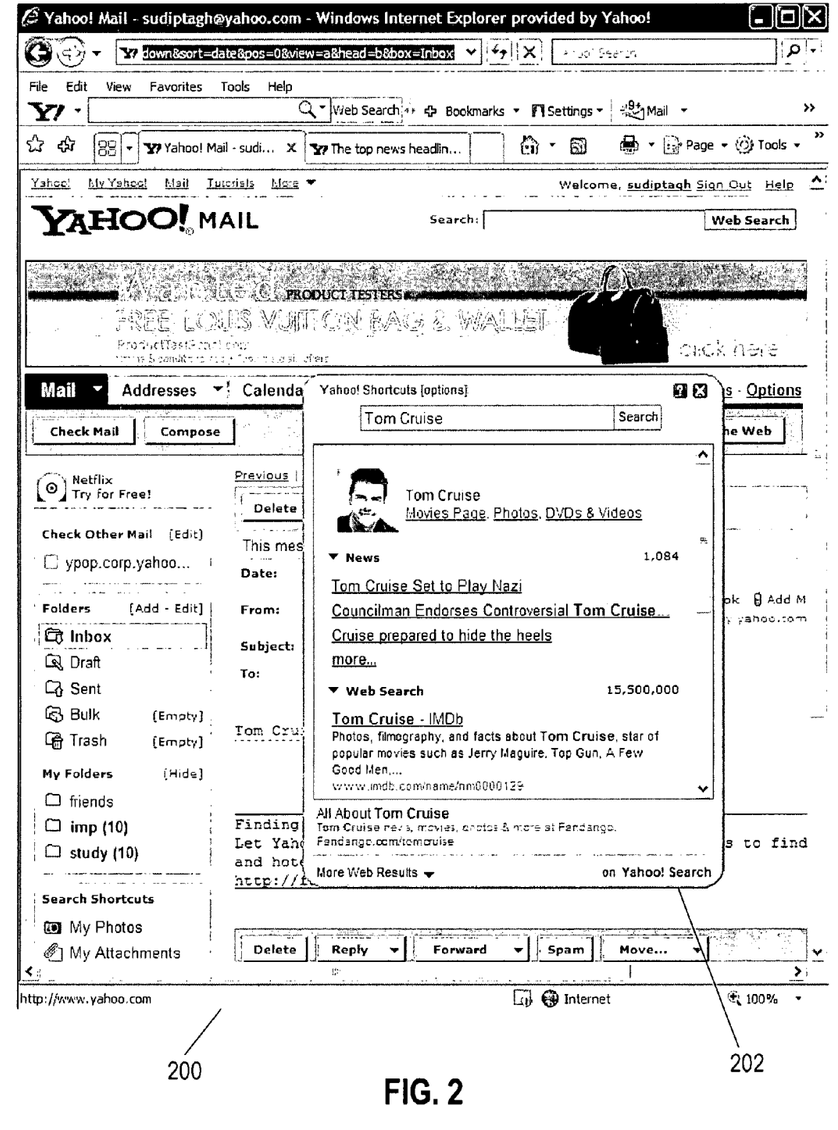
FIG. 2 shows an example of an application interface that displays search results selected from multiple different verticals using techniques described herein, according to one embodiment of the invention.

FIG. 2 shows an example of an application interface that displays search results selected from multiple different verticals using techniques described herein, according to one embodiment of the invention. In FIG. 2, a user of Yahoo! Mail has moved his mouse pointer over the automatically highlighted text "Tom Cruise" in an e-mail message. In response to the user's movement of his mouse pointer over the highlighted text, the Internet browser application has automatically popped-up a window 202 that indicates search results from two different verticals: "news" and "web." The specific verticals for which search results are displayed are selected according to techniques described herein.

Alternatives

In one embodiment of the invention, described above, verticals are ranked based on both historical query frequencies within verticals and historical search result selections within verticals. However, in an alternative embodiment of the invention, verticals are ranked based only on historical search result selections within verticals. In such an alternative embodiment of the invention, the verticals may be ranked based solely on the $cnq_v$ values that are associated with those verticals, without any regard to the $i_v$ values that might be associated with those verticals. In yet another alternative embodiment of the invention, verticals are ranked based only on historical query frequencies within verticals. In such an alternative embodiment of the invention, the verticals may be ranked based solely on the $i_v$ values that are associated with those verticals, without any regard to the $cnq_v$ values that might be associated with those verticals.

In one embodiment of the invention described above, historical query frequencies within verticals are determined in relation to two sets of query terms, $q'_1$ and $q'_2$, that have high proximity to the user-submitted set of query terms q. In alternative embodiments of the invention, more or fewer than two proximate query terms may be used to determine historical query frequencies within verticals, and the corresponding values $i_v$ for each vertical. Additionally or alternatively, the set of query terms q itself may be used instead of the proximate sets $q'_1$ and $q'_2$.

Hardware Overview

Figure 3:
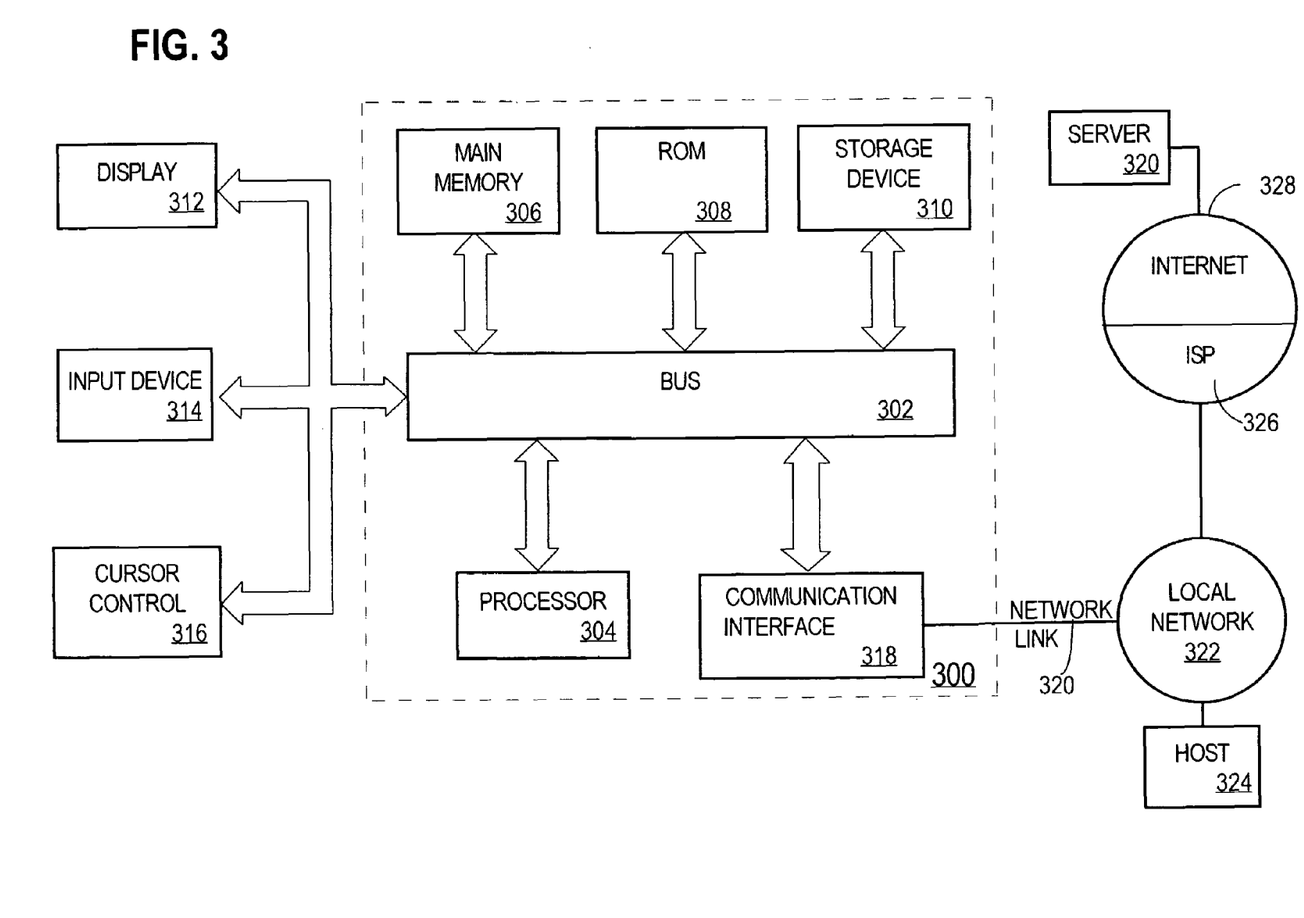
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving instructions, wherein said instructions are instructions which, when executed by one or more processors, cause the one or more processors to perform certain steps including:
   receiving a first set of query terms;
   for each vertical in a plurality of verticals, determining a number of previous searches that both (a) were performed based on the first set of query terms and (b) produced a set of search results, in the vertical, from which at least one search result was selected by a user;
   ranking verticals in the plurality of verticals based at least in part on said numbers determined for each vertical in the plurality of verticals, thereby generating a ranked list of verticals;
   selecting one or more selected verticals from the ranked list of verticals based on ranks of verticals in the ranked list of verticals; and
   presenting, for each particular vertical of the one or more selected verticals, one or more search results that are (a)

generated based on the first set of query terms and (b) within the particular vertical wherein the machine-executed operation is at least one of (a) storing said instructions onto a machine-readable storage medium, or (b) executing the instructions.

2. The method of claim 1, wherein the certain steps further include:

for each vertical in the plurality of verticals, determining a number of previous searches that were performed, in that vertical, based on a second set of query terms;

wherein ranking verticals in the plurality of verticals comprises ranking verticals in the plurality of verticals based at least in part on the numbers of previous searches that were performed, in that vertical, based on the second set of query terms.

3. The method of claim 2, wherein the certain steps further include:

determining the second set of query terms by selecting, from one or more previously submitted sets of query terms, a particular set of query terms that has a proximity, relative to the first set of query terms, that is above a specified threshold;

wherein the particular set of query terms differs from the first set of query terms.

4. The method of claim 3, wherein the proximity of the particular set of query terms relative to the first set of query terms is determined based at least in part on an extent to which a set of search results produced by a search for the particular set of query terms is similar to a set of search results produced by a search for the first set of query terms.

5. The method of claim 1, wherein ranking verticals in the plurality of verticals comprises:

determining, for each vertical in the plurality of verticals, a first value that is based on a number of search results that were selected in that vertical; and generating a first sorted list of values by sorting a list of said first values.

6. The method of claim 5, wherein ranking verticals in the plurality of verticals comprises:

determining, for each vertical in the plurality of verticals, a second value that is based on a number of searches that were performed relative to that vertical; and generating a second sorted list of values by sorting a list of said second values.

7. The method of claim 6, wherein ranking verticals in the plurality of verticals comprises:

setting a first pointer to point to a particular value in the first sorted list of values;

setting a second pointer to point to a particular value in the second sorted list of values;

determining a first vertical that corresponds to a value to which the first pointer points;

determining a second vertical that corresponds to a value to which the second pointer points; and adding, to the ranked list of verticals, one of: (a) the first vertical, and (b) the second vertical.

8. The method of claim 7, wherein adding, to the ranked list of verticals, one of the first vertical and the second vertical comprises:

determining a first delta based on a difference between (a) a value, in the second sorted list, that corresponds to the first vertical and (b) a value, in the first sorted list, that corresponds to the first vertical;

determining a second delta based on a difference between (a) a value, in the first sorted list, that corresponds to the first vertical, and (b) a value, in the second sorted list, that corresponds to the first vertical;

determining a third delta based on a difference between the first delta and the second delta;

determining whether the third delta is greater than a specified value;

if the third delta is not greater than the specified value, then adding the first vertical to the ranked list of verticals; and if the third delta is greater than the specified value, then adding the second vertical to the ranked list of verticals.

9. The method of claim 7, wherein ranking verticals in the plurality of verticals comprises:

if the first vertical is added to the ranked list of verticals, then advancing the first pointer in the first sorted list; and if the second vertical is added to the ranked list of verticals, then advancing the second pointer in the second sorted list.

10. The method of claim 7, wherein ranking verticals in the plurality of verticals comprises:

if the first vertical is added to the ranked list of verticals, then removing, from the first sorted list and the second sorted list, values that correspond to the first vertical; and if the second vertical is added to the ranked list of verticals, then removing, from the first sorted list and the second sorted list, values that correspond to the second vertical.

11. The method of claim 1, wherein presenting, for each particular vertical of the one or more selected verticals, the one or more search results comprises:

presenting, on a page, two or more search results from a first vertical of the one or more selected verticals; and presenting, on the same page, two or more search results from a second vertical of the one or more selected verticals;

wherein the first vertical is differs from the second vertical.

12. The method of claim 1, wherein presenting, for each particular vertical of the one or more selected verticals, the one or more search results comprises:

presenting, on a page, a first section of search results that indicates that the first section contains search results that were obtained from a first vertical of the one or more selected verticals; and presenting, on the same page, a second section of search results that indicates that the first section contains search results that were obtained from a second vertical of the one or more selected verticals;

wherein the first vertical differs from the second vertical.

13. The method of claim 1, wherein the plurality of verticals comprises two or more of: a "web" vertical, a "video" vertical, an "images" vertical, a "local" vertical, a "shopping" vertical, an "answers" vertical, an "audio" vertical, a "directory" vertical, a "jobs" vertical, and a "news" vertical.

14. The method of claim 1, wherein selecting one or more selected verticals from the ranked list of verticals based on ranks of verticals in the ranked list of verticals comprises selecting, from the ranked list of verticals, a specified number of verticals that are more highly ranked, in the ranked list of verticals, than any vertical that is not selected from the ranked list of verticals.

* * * * *